US012723802B2

(12) United States Patent
Shin et al.

(10) Patent No.: US 12,723,802 B2
(45) Date of Patent: Sep. 1, 2026

(54) REFRIGERATOR

(71) Applicant: LG ELECTRONICS INC., Seoul (KR)

(72) Inventors: Jungil Shin, Seoul (KR); Younghoon Gwak, Seoul (KR); Seonwoo Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 18/414,944

(22) Filed: Jan. 17, 2024

(65) Prior Publication Data

US 2024/0280313 A1 Aug. 22, 2024

(30) Foreign Application Priority Data

Feb. 22, 2023 (KR) ........................ 10-2023-0023442

(51) Int. Cl.
*F25D 23/02* (2006.01)
*E05B 17/00* (2006.01)

(52) U.S. Cl.
CPC ........ *F25D 23/028* (2013.01); *E05B 17/0033* (2013.01)

(58) Field of Classification Search
CPC .... F25D 25/025; F25D 23/028; F25D 23/021; F25D 23/02; A47B 95/20; E05B 17/0033; E05B 1/0053; E05B 65/0042; E05B 1/0015; E05B 1/003; E05F 11/54; E05F 11/10; E05Y 2201/422; E05Y 2201/426
See application file for complete search history.

(56) References Cited

U.S. PATENT DOCUMENTS

| | | | | |
|---|---|---|---|---|
| 8,328,301 | B2 * | 12/2012 | Lee | E05B 17/0033 292/336.3 |
| 9,297,572 | B2 * | 3/2016 | Bischoff | E05B 17/0033 |
| 9,506,685 | B2 * | 11/2016 | Park | F25D 23/028 |

(Continued)

FOREIGN PATENT DOCUMENTS

| | | | | |
|---|---|---|---|---|
| CN | 105466101 A * | 4/2016 | | F25D 23/028 |
| KR | 100281961 B1 * | 2/2001 | | F25D 23/028 |
| WO | WO-2021114657 A1 * | 6/2021 | | F25D 11/00 |

OTHER PUBLICATIONS

CN105466101 translation (Year: 2016).*

*Primary Examiner* — Hiwot E Tefera
(74) *Attorney, Agent, or Firm* — Birch, Stewart, Kolasch & Birch, LLP

(57) ABSTRACT

A refrigerator includes a cabinet having a storage space; a door opening and closing the storage space; a cap decoration defining a portion of the door and having a recessed handle; and a door opening device provided on the door and operated by a user to open the door. The door opening device includes a case coupled to the cap decoration inside the door; an operating member mounted inside the case and exposed to a recessed inside of the handle; a push member provided inside the case and protruding through the rear surface of the door; and a link provided inside the case connecting the operating member and the push member to each other; and a plurality of push members on both sides of the operating member such that, when the operating member is operated, the plurality of push members simultaneously push the cabinet to open the door.

19 Claims, 10 Drawing Sheets

(56) References Cited

U.S. PATENT DOCUMENTS

| | | | | |
|---|---|---|---|---|
| 2009/0205357 | A1* | 8/2009 | Lim | F25D 23/021 62/449 |
| 2010/0101267 | A1 | 4/2010 | Jung et al. | |
| 2011/0050066 | A1 | 3/2011 | Lee et al. | |
| 2011/0132024 | A1* | 6/2011 | Lim | E05B 17/0033 62/449 |
| 2011/0273070 | A1* | 11/2011 | Shin | F25D 23/028 312/405 |
| 2012/0280608 | A1* | 11/2012 | Park | E05B 1/0015 49/460 |
| 2013/0270990 | A1 | 10/2013 | Park et al. | |
| 2014/0319989 | A1 | 10/2014 | Hwang et al. | |
| 2017/0184337 | A1* | 6/2017 | Querfurth | E05B 17/0033 |
| 2017/0336131 | A1* | 11/2017 | Lee | E05F 11/10 |
| 2019/0024965 | A1* | 1/2019 | Park | F25D 23/028 |
| 2022/0011040 | A1* | 1/2022 | Son | E05B 17/0033 |
| 2022/0214096 | A1* | 7/2022 | Han | E05B 7/00 |
| 2023/0204278 | A1* | 6/2023 | Lim | F25D 23/028 16/412 |

* cited by examiner

REFRIGERATOR

CROSS-REFERENCE TO RELATED APPLICATIONS

The present application claims the benefit under 35 U.S.C. § 119 of Korean Patent Application No. 10-2023-0023442, filed in the Republic of Korea on Feb. 22, 2023, which is hereby incorporated by reference in its entirety.

BACKGROUND

The present disclosure relates to a refrigerator.

In general, a refrigerator is a home appliance that allows low-temperature storage of food in an internal storage space shielded by a door. To this end, the refrigerator is configured to cool the inside of the storage space using cool air generated through heat exchange with a refrigerant circulating in the refrigerating cycle, thereby storing stored food in an optimal state.

Recently, refrigerators are gradually becoming larger and more multi-functional in accordance with the trend of changing dietary habits and upgrading products, and refrigerators equipped with various structures and convenience devices that enable users' convenience and efficient use of internal space are being released.

The storage space of the refrigerator may be opened and closed by a door. Refrigerators may be classified into various types according to the disposition of the storage space and the structure of a door that opens and closes the storage space.

Typically, the door of the refrigerator may have a structure that is opened and closed by rotation or sliding. In addition, the handle may protrude or be recessed to open the door.

In addition, when the door is large and heavy, when a negative pressure is generated due to low temperature inside the refrigerator, because of magnetic force of the door gasket, or the like, a lot of force may be required to open the door, which may cause inconvenience to the user.

In order to solve such a problem, a device that facilitates a user's door opening has been developed.

SUMMARY

An object of an embodiment of the present disclosure is to provide a refrigerator in which a door opening device is disposed inside a handle of a recessed door, making it easy to open and operate the door.

An object of an embodiment of the present disclosure is to provide a refrigerator equipped with a door opening device that enables effective force transmission through a plurality of push members, making door opening easier and ensuring durability.

A refrigerator according to an embodiment of the present disclosure includes a cabinet having a storage space; a door opening and closing the storage space and filled with an insulator therein; a cap decoration forming at least a portion of a circumference of the door and having a recessed handle; and a door opening device provided on the door and operated by a user to open the door, in which the door opening device may include a case coupled to the cap decoration inside the door to form a space where the insulator is not introduced; an operating member mounted inside the case and exposed to a recessed inside of the handle; a push member provided inside the case and protruding through the rear surface of the door; and a link is provided inside the case and allows the operating member and the push member to be interlocked with each other, and in which a plurality of push members may be provided on both sides of the operating member, and when the operating member is operated, the plurality of push members may simultaneously push the cabinet to open the door.

A pair of the push members and links may be disposed on both sides of the operating member, respectively, and supporters may be provided at both ends of the operating member to be in contact with the link and operate the link.

The supporter may be formed with supporter rotation shafts that protrude on both left and right sides and are axially coupled to the case, and the supporter rotation shaft may serve as a rotation center of the operating member.

The supporters may include a supporter body coupled to both ends of the operating member; and a supporter extension extending from a lower end of the supporter body to be in contact with the link, and in which the supporter rotation shaft may be provided between the supporter body and the supporter extension.

The link may include a first part extending to be in contact with the supporter; a second part extending from the front end of the first part to the push member; and a link rotation shaft provided between the first part and the second part and protruding on both left and right sides and serves as a rotation center of the link, and the link rotation shaft may be axially coupled to the case.

The case may include a center case forming the central portion of the case; and side cases coupled to both left and right sides of the center case to form both left and right sides of the case, and first shaft coupling portion to which the supporter rotation shaft is coupled and a second shaft coupling portion to which the link rotation shaft may be axially coupled are formed on both sides of the center case and the side case facing each other.

An operating member accommodation portion recessed downward may be formed in the center case so that the lower end of the operating member is operably accommodated.

The center case may be composed of a first center case and a second center case based on the center of the center case, and a space in which the operating member is accommodated by coupling the first center case and the second center case may be formed.

The case may include a center case accommodating the operating member; and a side case that is coupled to both left and right sides of the center case to form both left and right sides of the case, and a space in which the link and push members are movably mounted may be formed by combining the center case and the side case.

A push member accommodation portion may be recessed on both sides of the center case and the side case, and the push member may be mounted to be slidably movable inside the push member accommodation portion in a front and rear direction.

A supporter protruding toward the link may be provided at the lower end of the operating member, and the link further may include a connection portion extending past the supporter and in contact with the supporter; first parts formed at both ends of the connection portion; a second part extending upward from the first part and being in contact with each of the pair of push members; and a link rotation shaft that protrudes from an outer surface of the first part and is axially coupled to the case.

The case may include a center case forming a space in which the operating member and the link are accommodated; and a side case that is coupled to both left and right sides of the center case to form both left and right sides of the case, a first shaft coupling portion to which a supporter rotation shaft formed on the supporter is connected may be formed in the center case, and a second shaft coupling portion to which the link rotation shaft is connected may be formed in the side case.

The center case may consist of a pair of first center case and second center case that are coupled to each other, and the first center case and the second center case may be provided with a pair of first shaft coupling portions into which both ends of the supporter rotation shaft are inserted when the first center case and the second center case are coupled.

The link rotation shaft may be inserted into the second shaft coupling portion when the side cases on both sides are coupled to the center case.

The width of the operating member may be smaller than the width of the handle, and the plurality of push members may be located between both ends of the handle and both ends of the operating member.

The push members may be provided on both sides of the operating member, respectively, and the pair of push members may be disposed closer to both ends of the handle groove than to both ends of the operating member.

A handle opening through which the operating member passes may be formed in the handle, and the operating member may protrude into a recessed space of the handle through the handle opening in a non-operated state.

The operating member may be rotated to approach the front surface of the door when operated by a user.

The handle opening may be formed by cutting a front surface and a lower surface of the recessed space of the handle.

The handle may be recessed into the upper cap decoration forming the upper surface of the door, the upper cap decoration may be formed with a handle opening through which the operating member passes and a push member opening through which the push member passes, and the case may be mounted on the lower surface of the upper cap decoration, and accommodate both the handle opening and the push member opening.

In the refrigerator according to the proposed embodiment, the following effects can be expected.

The refrigerator according to an embodiment of the present disclosure is equipped with a door opening device inside the handle, making it easy to open the door, and improving the outer appearance by preventing the door opening device from being exposed.

In particular, the operating member operates while rotating toward the front surface of the door, so that the user can easily open the door with just one action of holding and pulling the handle, thereby further improving convenience of use.

Additionally, the operating member may be disposed at the center of the handle in the horizontal direction, and may have a structure in which a plurality of push members are provided at positions corresponding to both sides of the operating member. Accordingly, when the operation member is operated, the plurality of push members push the cabinet from a plurality of points to open the door, thereby making it possible to open the door more smoothly. In particular, it is possible to ensure that a sliding door is withdrawn stably without being deviated to one side.

Additionally, the width of the operating member in the horizontal direction is formed to be smaller than the width of the handle in the horizontal direction, and the push member may be disposed at both ends of the operating member. Accordingly, by not arranging the operating member excessively outward and moving it at a point adjacent to the operating member in the front and rear direction, the force applied when operating the operating member can be effectively transmitted.

In addition, even if one side of the operation member is pressed, uniform force can be stably transmitted to the push members on both sides, which has the advantage of ensuring stable opening of the door.

In addition, the door opening device prevents penetration of the insulator by the case and provides a space inside for the operation of the operating member, link, and push member. Therefore, installation of the door opening device can be made easier and assembly efficiency can be improved.

In particular, the case is composed of a center case and side cases on both sides of the center case, and the link and push member can be placed movably by coupling the center case and the side cases, thereby improving assembly efficiency.

DETAILED DESCRIPTION OF THE EMBODIMENTS

Hereinafter, specific embodiments of the present disclosure will be described in detail with drawings. However, the present disclosure cannot be said to be limited to the embodiments in which the spirit of the present disclosure is presented, and other degenerative disclosures or other embodiments included in the scope of the present disclosure can be easily suggested by adding, changing, or deleting other components.

Define direction before description. In an embodiment of the present disclosure, the direction toward the door may be defined as a front direction based on the cabinet illustrated in FIG. 1, the direction toward the cabinet may be defined as a rear direction based on the door, the direction toward the floor where the refrigerator is installed may be defined as a lower direction, and the direction away from the floor may be defined as an upper direction.

Figure 1:
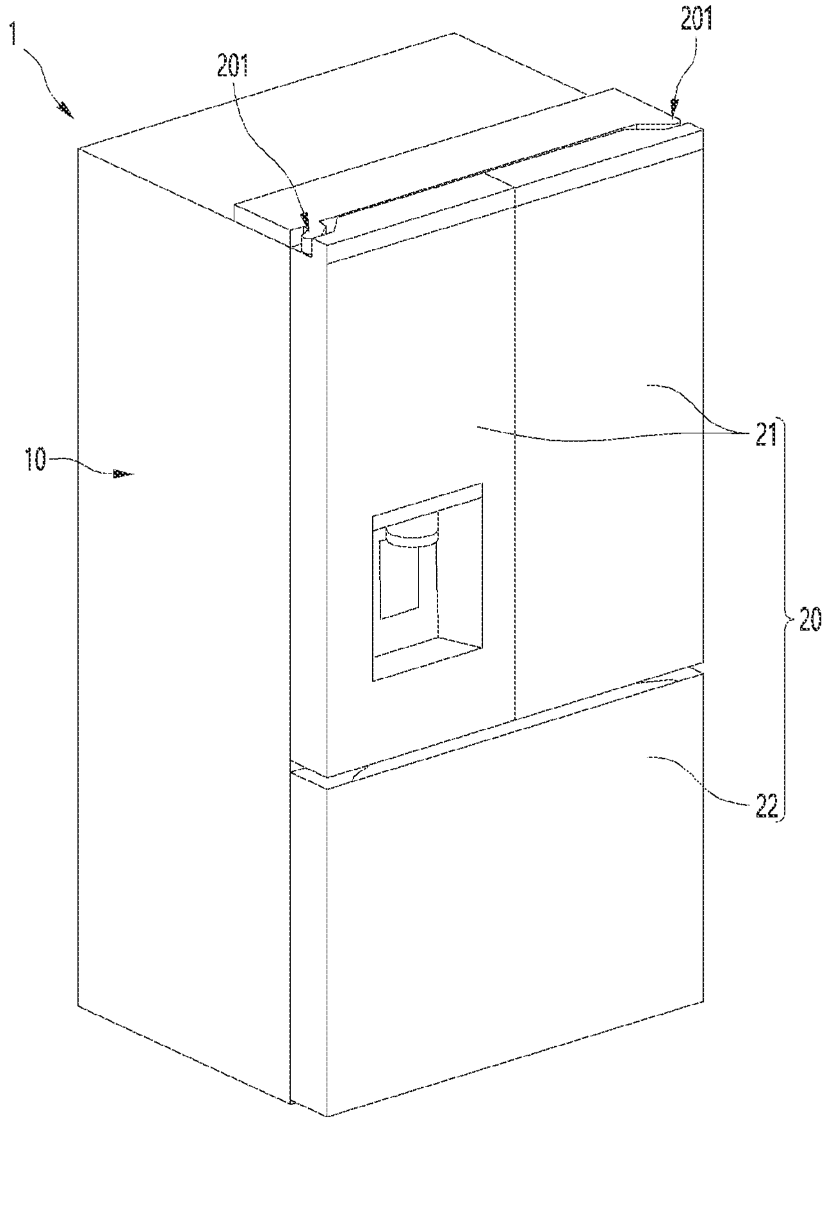
FIG. 1 is a perspective view illustrating a refrigerator according to an embodiment of the present disclosure.
Figure 2:
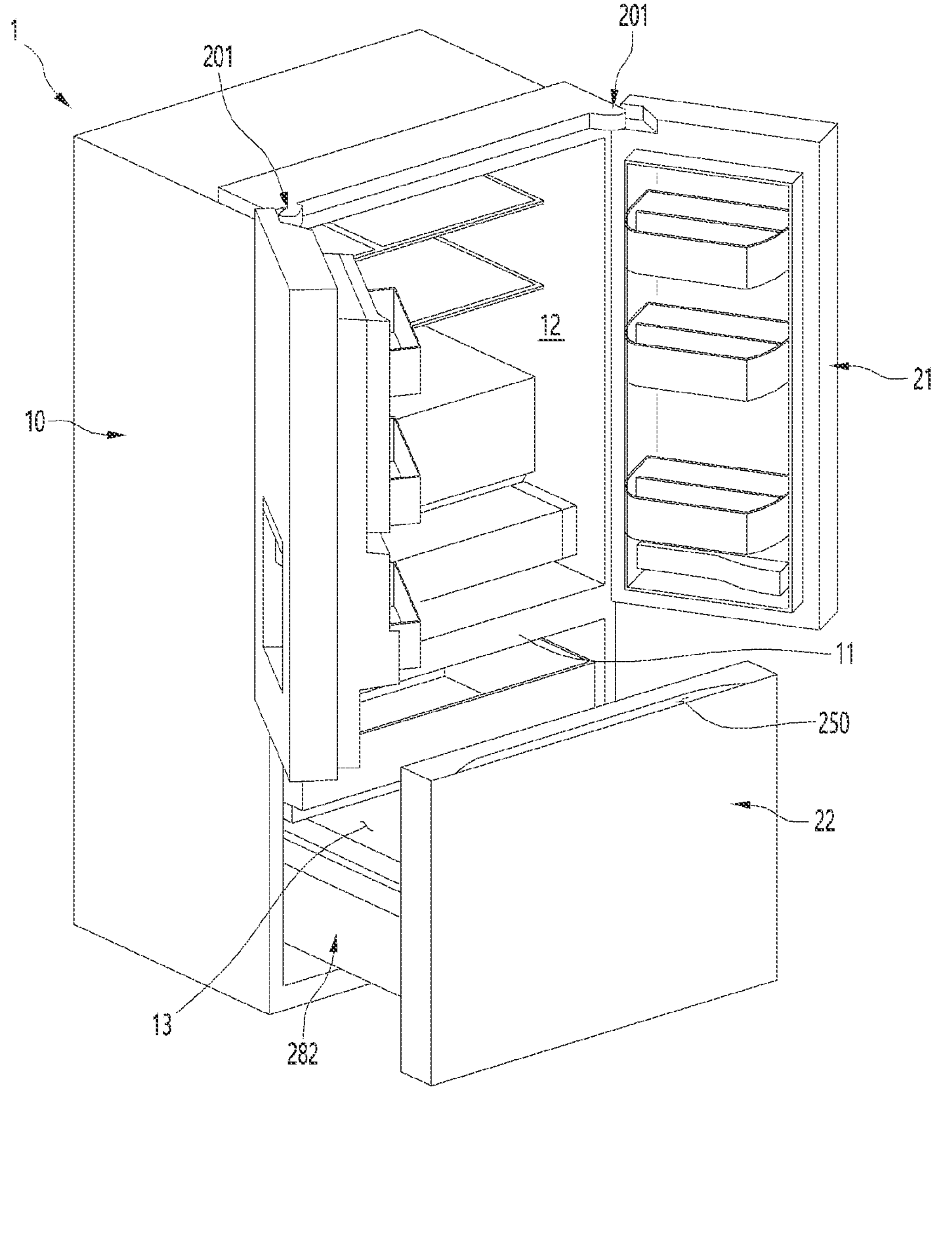
FIG. 2 is a perspective view illustrating a state where a door of the refrigerator is open.
Figure 3:
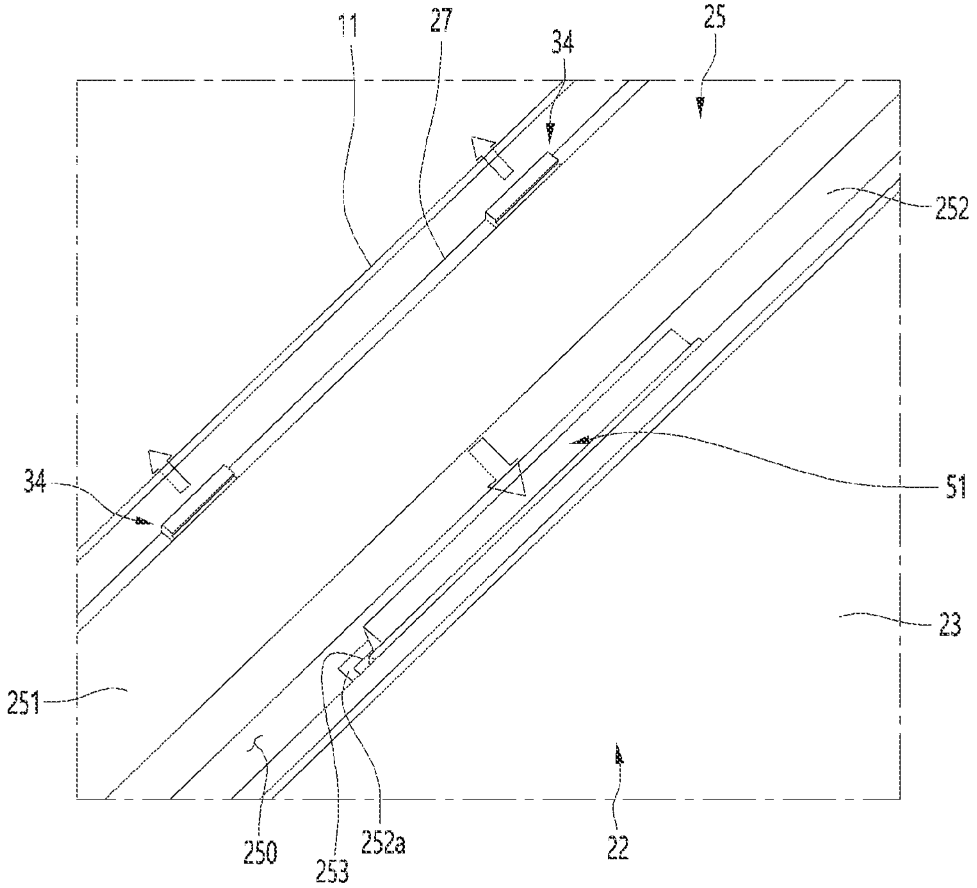
FIG. 3 is an enlarged view illustrating the handle on the door surface.

FIG. 1 is a perspective view illustrating a refrigerator according to an embodiment of the present disclosure, FIG. 2 is a perspective view illustrating a state where a door of the refrigerator is open, and FIG. 3 is an enlarged view illustrating the handle on the door surface.

As illustrated, the refrigerator 1 according to the first embodiment of the present disclosure may include a cabinet 10 forming a storage space and a door 20 opening and closing the storage space.

The storage space of the cabinet 10 may be partitioned vertically by barriers 11, and a refrigerating chamber 12 may be formed at the upper portion and a freezing chamber 13 may be formed at the lower portion. In addition, the door 20 may include a refrigerating chamber door 21 opening and closing the refrigerating chamber 12 and a freezing chamber door 22 opening and closing the freezing chamber 13.

The refrigerating chamber door 21 may be mounted to the cabinet 10 by a hinge device 201 such that a pair of doors are rotatable on both left and right sides. In addition, the refrigerating chamber door 21 may open and close the refrigerating chamber 12 by rotation. Accordingly, the refrigerating chamber door 21 may be referred to as a rotary door. In addition, a handle may be provided on the lower surface of the refrigerating chamber door 21 so that the user can rotate the door 20 by inserting his/her hand.

The freezing chamber door 22 may be mounted to the cabinet 10 to be slidably drawn in and out. In addition, the freezing chamber 13 can be opened and closed by being drawn in and out of the freezing chamber door 22. In addition, the freezing chamber door 22 includes a basket 282 on the rear side of the door and may be configured in the form of a drawer. Accordingly, the freezing chamber door 22 may be referred to as a drawer type door. In addition, a handle 250 into which a hand of a user can be inserted and draw in and out the freezing chamber door 22 may be provided on an upper surface of the freezing chamber door 22.

In the embodiment of the present disclosure, a bottom freeze type refrigerator in which the freezing chamber 13 is provided below is described as an example, but the present disclosure can be applied to all types of doors in which the handle 250 is recessed.

A door opening device 30 (see FIG. 4) is disposed on the handle 250 to make it easier to open the freezing chamber door 22. In this embodiment, the case where the door opening device 30 is applied to the freezing chamber door 22 or the drawer type door will be described as an example. Of course, the door opening device 30 may be provided on the refrigerating chamber door 21 or the rotary door.

The handle 250 may be recessed on an upper surface of the freezing chamber door 22. In addition, an operating member 51 that can be operated by a user may be disposed on the recessed inner surface of the handle 250. The operating member 51 is disposed on the recessed inner surface of the handle 250 and may be disposed forward from the center of the handle 250. Accordingly, when the user grasps the handle 250 to open the freezing chamber door 22, the operating member 51 may be naturally operated. In addition, the operating member 51 is disposed inside the handle 250 and is not exposed to the outside when the refrigerator 1 is viewed from the front.

In addition, when the operating member 51 is operated, the push member 34 protrudes from the rear surface of the freezing chamber door 22 to push the cabinet 10 or the barrier 11 to open the freezing chamber door 22. At this time, a plurality of the push members 34 may be arranged side by side, and may be arranged closer to the center than the left and right sides of the freezing chamber door 22. Therefore, when operating the operating member 51, force can be easily transmitted to the push member 34 and the freezing chamber door 22 can be opened more easily.

The remaining portion of the door opening device 30, excluding the operating member 51 and a portion of the push member 34, is disposed inside the freezing chamber door 22 and is not exposed. In particular, when the freezing chamber door 22 is viewed from the front, the operating member 51 is located inside the handle 250 and is not visible to the user.

Hereinafter, a structure in which the door opening device 30 is provided in the freezing chamber door 22 will be described as an example.

Figure 4:
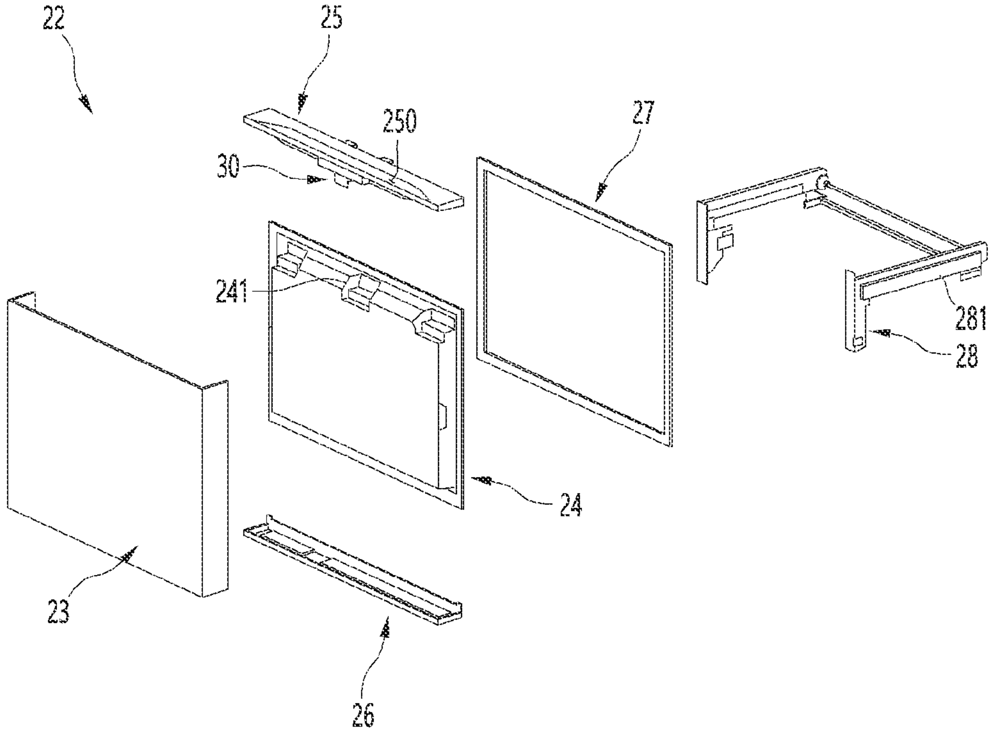
FIG. 4 is an exploded perspective view illustrating the door.
Figure 5:
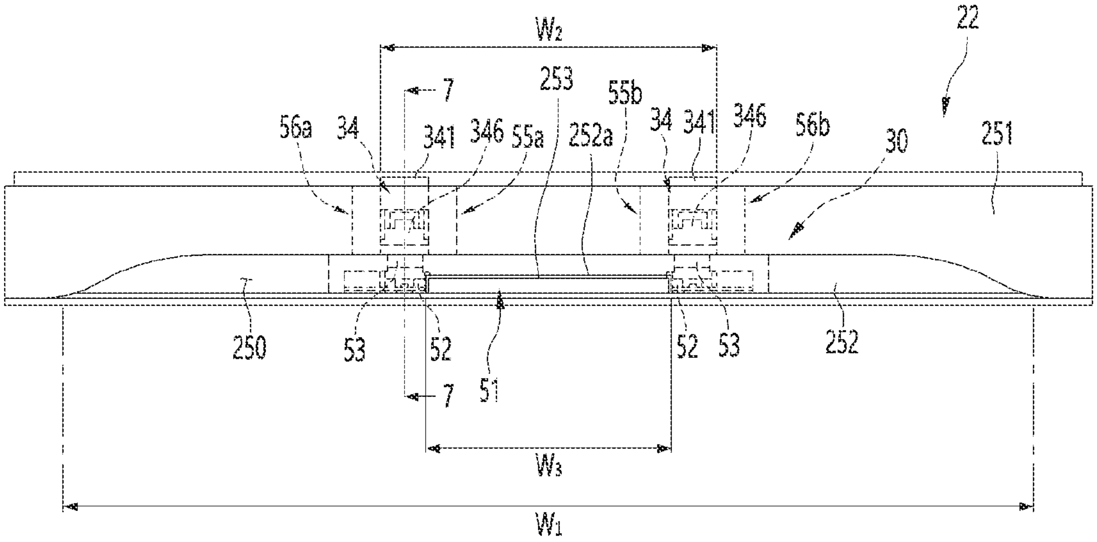
FIG. 5 is a plan view illustrating the door.
Figure 6:
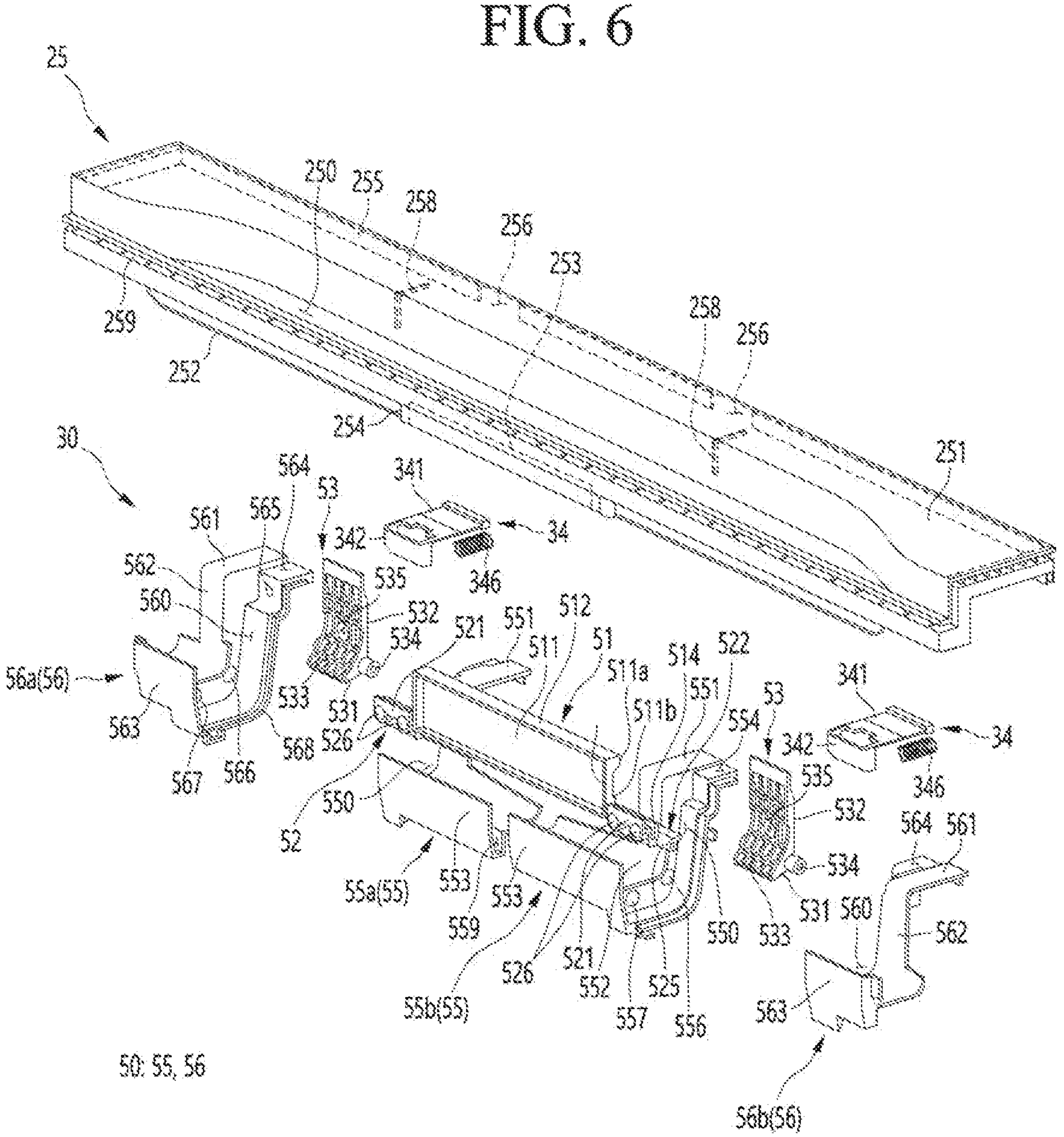
FIG. 6 is an exploded perspective view illustrating the structure of the upper cap decoration of the door and the door opening device.

FIG. 4 is an exploded perspective view illustrating the door, FIG. 5 is a plan view illustrating the door, and FIG. 6 is an exploded perspective view illustrating the structure of the upper cap decoration of the door and the door opening device.

As illustrated in the drawing, the freezing chamber door 22 may include a door plate 23 forming a front surface, a door liner 24 forming a rear surface, and cap decorations 25 and 26 forming upper and lower surfaces. An insulator 29 (in FIG. 7) may be filled inside the freezing chamber door 22 where the door plate 23, the door liner 24, and the cap decorations 25 and 26 are coupled.

The door plate 23 may form the front and both side surfaces of the freezing chamber door 22. For example, the door plate 23 may be formed of a metal material. In addition, the door liner 24 may be formed of a plastic material and may be molded to form the shape of the rear surface of the door 20. In addition, a liner recessed portion 241 may be formed in the door liner 24 to provide a disposition space for the door opening device 30. The liner recessed portion 241 is recessed at a position corresponding to that of the door opening device 30 to maintain a constant distance from the door opening device 30. Accordingly, the disposition thickness of the insulator 29 can be secured even at the position where the door opening device 30 is mounted.

A gasket 27 may be provided along the rear circumference of the door liner 24. The gasket 27 may contact the front surface of the cabinet 10 when the door is closed to make the freezing chamber 13 airtight.

In addition, door frames 28 may be formed on both left and right sides of the door liner 24. The door frame 28 may extend rearward, and the door basket 282 may be seated therein. In addition, a rail 281 is provided on the door frame 28 so that the freezing chamber door 22 can be slid in and out.

The cap decorations 25 and 26 may include an upper cap decoration 25 forming the upper surface of the freezing chamber door 22 and a lower cap decoration 26 forming the lower surface of the freezing chamber door 22. In addition, the handle 250 may be formed on the upper cap decoration 25. In addition, a door opening device 30 may be provided at the center of the upper cap decoration 25 in the left and right directions.

The upper cap decoration 25 includes a decoration upper surface 251 forming an upper surface, and a handle portion 252 forming the handle 250 may be recessed in the decoration top surface 251. In addition, the handle portion 252 may extend along the left and right longitudinal directions of the upper cap decoration 25.

The handle portion 252 may be recessed downward from the decoration upper surface 251 to form the inner surface of the handle 250. In addition, the handle portion 252 is disposed close to the front surface of the freezing chamber door 22 in the front and rear direction, so that the user can put his or her hand into the handle 250 and grasp the handle together with the front surface of the freezing chamber door 22.

A handle opening 253 in which the operating member 51 is positioned may be formed in the handle portion 252. In addition, the operating member 51 may be exposed to the inside of the handle 250 through the handle opening 253. Accordingly, the operating member 51 can be moved by the user's manipulation inside the handle 250.

Additionally, a guide protrusion 252*a* may be formed inside the handle 250, protruding along the circumference of the handle opening 253. The guide protrusion 252*a* may be in contact with the lower protrusion 511*b* formed on the operating member 51 to align the handle 250.

A guide rib 258 that guides the installation of the door opening device 30 may protrude downward from the lower surface of the upper cap decoration 25. The guide rib 258 supports the case 50, which will be described below, on both left and right sides, so that the door opening device 30 can be aligned at the exact position of the upper cap decoration 25.

A case mounting portion 254 on which the door opening device 30 is mounted may be formed on the upper cap decoration 25. Additionally, the handle opening 253 may be opened at a position corresponding to the case mounting portion 254. Also, when the case 50 is coupled to the case mounting portion 254, the operating member 51 can pass through the handle opening 253 and be positioned inside the handle 250.

It may include a decoration edge 255 extending downward along the circumference of the decoration upper surface 251. Additionally, an edge opening 256 through which the push member 34 passes may be formed on one side of the rear surface of the decoration edge 255. The edge opening 256 may be formed at a position corresponding to a pair of the push members 34, and a pair of edge openings may be spaced apart from each other.

An insertion portion 259 into which the end portion of the door plate 23 is inserted may be further formed around the front surface and both sides of the upper cap decoration 25. The door plate 23 may be inserted into the insertion portion 259 and coupled to the upper cap decoration 25. At least a portion of the insertion portion 259 may extend to pass the handle 250 from the front, and the door plate 23 may be disposed to cover the handle 250 from the front.

The door opening device 30 may include the operating member 51, a link 53, a push member 34, and a case 50.

The operating member 51 is a portion operated by the user and may be exposed to the inside of the handle 250. The operating member 51 may be made of a plastic material that can be integrated with the upper cap decoration 25.

The operating member 51 extends in the left and right direction and may include an operating portion 511 shaped like a plate that the user operates. The operating portion 511 may have a size corresponding to the handle opening 253. Accordingly, the operating member 51 can be exposed to be operated inside the handle 250 while shielding the handle opening 253.

Additionally, the rear surface of the operating portion 511 may be in contact with the user's hand. Additionally, an upper protrusion 511*a* protruding backward may be formed at the upper end of the operating portion 511. The upper protrusion 511*a* may extend to both ends of the operating portion 511 in the left and right direction. The upper protrusion 511*a* protrudes so that the user's finger can be caught, making it easier to operate the operating member 51.

A lower protrusion 511*b* protruding backward may be provided at the lower portion of the operating portion 511. The lower protrusion 511*b* may shield a portion of the handle opening 253 from above. Also, when the operating member 51 returns after being operated, the operating member 51 can be kept in a stationary state at a position set in contact with the guide protrusion 252*a*.

An operating portion edge 512 may protrude forward around the operating portion 511. The operating portion edge 512 may form a circumferential surface of the operating member 51. In addition, a structure for reinforcing the strength of the operating member 51 may be further provided in the space inside the operating portion edge 512.

At the lower end of the operating portion 511, operating member coupling portions 514 protruding on both left and right sides may be formed. A supporter 52 may be coupled to the operating member coupling portion 514. The supporter 52 may be configured to rotate together with the rotation of the operating member 51 to rotate the link 53. A pair of supporter 52 may be provided on both left and right sides and may be coupled to the operating member 51. The supporter 52 may be molded integrally with the operating member 51. Also, since the supporter 52 transmits rotational force to the link 53, the supporter may also be referred to as a transmission portion or an action portion.

The supporter 52 may be made of a material with higher strength than the operating member 51. The supporter 52 may include a supporter body 521 coupled to the operating member 51, and a supporter extension 522 extending from the supporter body 521 to operate the link 53.

The supporter body 521 is disposed on the front surface of the operating member coupling portion 514, and can be firmly coupled to the operating member coupling portion by fastening screws. The supporter extension 522 may extend rearward from the lower end of the supporter body 521. The supporter extension 522 may extend to be in contact with the link 53. Also, the link 53 can be rotated by the supporter extension 522.

Supporter rotation shafts 525 may be formed to protrude on both left and right sides of the supporter extension 522. The supporter rotation shaft 525 may be axially coupled to the inside of the case 50, which will be described below. The supporter rotation shaft 525 may become the rotation shaft of the operation member 51 when the operation member 51 is operated. Also, when the operating member 51 is rotated, the supporter 52 rotates together so that the end portion of the supporter extension 522 rotates the link 53. The supporter rotation shaft 525 may be referred to as a first rotation shaft.

The link 53 may be provided at the rear of the supporter 52. The link 53 allows the push member 34 to be linked when the operating member 51 is operated, and can be rotatably mounted on the case 50. The link 53 may be referred to as a rotating member.

The link 53 may be provided at a position corresponding to the supporter 52. Accordingly, a pair of links 53 may be provided on both left and right sides of the operating member 51, and may be in contact with the supporter 52, respectively.

The link 53 may include a first part 531, a second part 532, and a link rotation shaft 534. The first part 531 may extend forward from the link rotation shaft 534. Additionally, the first part 531 may extend to be in contact with the supporter extension 522. Therefore, when the supporter 52 rotates, the supporter extension 522 can rotate the first part 531 while pushing the first part upward from downward.

The second part 532 may extend upward from the link rotation shaft 534. The second part 532 may extend toward the front end of the push member 34. The second part 532 may be in contact with the front end of the push member 34, and when the link 53 rotates, the second part 532 may push the push member 34 rearward and move the push member.

A plurality of reinforcement portions 533 may be formed on the front surface of the link 53. The reinforcing portion 533 may be formed on the first part 531 and the second part 532, and may be configured so that a plurality of ribs are disposed in a lattice shape to reinforce the strength of the link.

A shock absorbing member 536 may be mounted on the second part 532. The shock absorbing member 536 may be formed of an elastic material such as rubber or silicon. The shock absorbing member 536 may protrude forward of the link 53, and may come into contact with one side of the upper cap decoration 25 according to the rotation of the link 53. For example, in a state where the operating member 51 is not operated, the shock absorbing member 536 may come into contact with the handle portion 252. When the link 53 returns after being rotated, the shock absorbing member 536 comes into contact with the handle 252 to relieve the impact and the link 53 does not rotate further. A mounting hole 535 into which a separately molded shock absorbing member 536 is inserted and mounted may be formed in the second part 532.

The link rotation shaft 534 may protrude from both left and right sides of the link 53. The link rotation shaft 534 may be formed at a position adjacent to the rear end of the first part 531 and the lower end of the second part 532. The link rotation shaft 534 may be coupled to an inner surface of the case 50 and may cause the link 53 to rotate within the case 50. The link rotation shaft 534 may be referred to as a second rotation shaft.

The push member 34 may be mounted to slide in the case 50 in the front and rear direction. In addition, a portion of the push member 34 is provided inside the case 50, and the other portion thereof can protrude backward through the case 50 and the upper cap decoration 25. Further, the push member 34 may include a sliding portion 341 extending rearward and a pressing portion 342 extending downward from the front end of the sliding portion 341.

The sliding portion 341 may be located inside the case 50 and the upper cap decoration 25. The front end of the sliding portion 341 may pass through the frame opening 256 and be exposed to the outside of the upper cap decoration 25. In this case, the front end of the sliding portion 341 may be thicker than the rest of the sliding portion 341. In addition, the front end of the sliding portion 341 may push the front surface of the cabinet 10 or the barrier 11 to open the freezing chamber door 22.

The pressing portion 342 is formed at the front end of the sliding portion 341 and may extend downward to a position in contact with the link 53. Therefore, it can contact the upper end of the link 53, that is, the upper end of the second part 532, and can be moved in the front and rear direction as the link 53 rotates.

An elastic member mounting portion 342*a* protruding backward may be formed at the rear surface of the pressing portion 342. One end of the elastic member 346 may be fixedly mounted on the elastic member mounting portion 342*a*. The other end of the elastic member 346 is supported by the elastic member mounting portion 565 formed in the case 50, so that elastic force can be provided in the introduction direction of the push member 34.

The case 50 may form the outer appearance of the door opening device 30. When the case 50 is mounted on the freezing chamber door 22, it can form a space into which the insulator 29 inside the freezing chamber door 22 does not penetrate. Also, the operating member 51, link 53, and push member 34 can be operably mounted in the space inside the case 50.

The upper surface of the case 50 may be coupled to the upper cap decoration 25, and the front and rear ends may be coupled to the door plate 31 and the door liner 24, respectively. The case 50 may be placed in the center of the upper surface of the upper cap decoration 25, and may be placed in an area that at least partially overlaps the handle 250. The case 50 may be formed so that multiple portions are connected to each other.

As an example, the case 50 may include a center case 55 that forms the central portion of the case 50, and side cases 56 that form both left and right sides of the case 50. The overall outer appearance of the case 50 can be formed by coupling the center case 55 and the side case 56. Also, when the case 50 is coupled, the operating member 51, the supporter 52, the link 53, and the push member 34 can be placed inside, and the case 50 is kept in the coupled state and the case can be mounted on the lower surface of the upper cap decoration 25.

The center case 55 is in contact with the lower surface of the handle portion 252 and may be placed in the center of the handle 250.

In addition, the upper surface 551 of the center case 55 may be mounted to be in contact with the decoration upper surface 251 of the upper cap decoration 25 inside the freezing chamber door 22. Accordingly, the upper surface 551 of the center case 55 is arranged parallel to the decoration upper surface 251 and can be mounted so that they are in surface contact with each other.

The center push member accommodation portion 554 may be recessed downward on the upper surface 551 of the center case 55. The center push member accommodation portion 554 may be recessed to accommodate the push member 34. The center push member accommodation portion 554 may be formed on both left and right sides of the center case 55, respectively. In addition, when the center case 55 and the side case 56 are coupled to each other, the center push member accommodation portion 554 may form a space for accommodating the push member 34 together with the side push member accommodation portion 560.

A downwardly recessed surface 552 is formed in the center case 55, and the recessed surface 552 may be in contact with the handle portion 252. In addition, an operating member accommodation portion 559 in which the lower end of the operating member 51 is accommodated may be formed in the recessed surface 552. The operating member 51 may be operated while accommodated in the operating member accommodation portion 559.

Meanwhile, the center case 55 may be composed of a first center case 55*a* and a second center case 55*b* based on the center of the center case 55. The first center case 55*a* and the second center case 55*b* may be molded separately and then coupled to each other.

In addition, center coupling portions 558 may be formed on both left and right ends of the center case 55 to be coupled to the side cases 56. Additionally, a recessed center accommodation portion 550 may be formed on both left and right sides of the center case 55 to accommodate the link 53. The center accommodation portion 550 may be combined with the side case 56 to form a space in which the link 53 is accommodated. In addition, on the side of the center accommodation portion 550, a first shaft coupling portion 557 on which one end of the supporter rotation shaft 525 is mounted, and a second shaft coupling portion 556 on which one end of the link rotation shaft 534 is mounted can be formed.

The front surface 551 of the center case 55 may extend upward from the lower end of the recessed surface 552 and may be in contact with the front surface of the handle portion 252.

Meanwhile, the side case 56 may be coupled to both sides of the center case 55 to form both sides of the case 50. The side case 56 may include a first side case 56*a* coupled to the first center case 55*a* and a second side case 56*b* coupled to the second center case 55*b*.

The upper surface 561 of the side case 56 may be in contact with the decoration upper surface 251 of the upper cap decoration 25 inside the freezing chamber door 22. The upper surface 561 of the side case 56 is formed parallel to the decoration upper surface 251 and may be in close contact with the decoration upper surface 251.

Additionally, a side push member accommodation portion 560 may be formed on the upper surface of the side case 56. The side push member accommodation portion 560 may be recessed downward to accommodate the push member 34. The side push member accommodation portion 560 may be coupled to the center case 55 to form a space in which the push member 34 is accommodated. In other words, by combining the center case 55 and the side case 56, the center push member accommodation portion 554 and the side push member accommodation portion 560 form a space in which the push member 34 is disposed. In addition, when the case 50 is mounted on the upper cap decoration 25 in an assembled state, the upper side of the push member 34 is obscured by the upper cap decoration 25, and the push member 34 can be mounted in a state where it can move in the front and rear direction.

A downwardly recessed surface 562 is formed in the side case 56, and the recessed surface 562 can be in contact with the handle portion 252. Additionally, a side coupling portion 568 may be formed at the right end of the first side case 56*a*, which is coupled to the center coupling portion 558 formed at the left end of the first center case 55*a*. Additionally, a side coupling portion 568 may be formed at the left end of the second side case 56*b*, which is coupled to the center coupling portion 558 formed at the right end of the second center case 55*b*. The first side case 56*a* and the second side case 56*b* have the same structure and shape, and may be formed to be symmetrical to each other with respect to the center case 55.

Additionally, a recessed side accommodation portion 560 may be formed in the side case 56 to accommodate the link. The side accommodation portion 560 may form a space in which the link 53 is accommodated by coupling to the center case 55. In other words, by coupling the center case 55 and the side case 56, the center accommodation portion 550 and the side accommodation portion 560 may form a space where the link 53 and the supporter 52 are placed.

In addition, on the side of the side accommodation portion 560, a first shaft coupling portion 567 on which one end of the supporter rotation shaft 525 is mounted, and a second shaft coupling portion 566 on which one end of the link rotation shaft 534 is mounted can be formed.

In other words, both ends of the supporter rotation shaft 525 and both ends of the link rotation shaft 534 can be rotatably mounted on first shaft coupling portions 557 and 567 and second shaft coupling portions 556,566 formed on the inner surfaces of the center case 55 and the side case 56, respectively.

The front surface 563 of the side case 56 may extend upward from the lower end of the recessed surface 562 and may be in contact with the front surface of the handle portion 252.

Meanwhile, when the center case 55 and the side case 56 are all assembled, the operating member 51, the supporter 52, the link 53, and the push member 34 can be placed in an operable state inside the case 50.

In addition, the case 50 is mounted to be in contact with the lower surface of the upper cap decoration 25, and at this time, the operating member 51 passes through the handle opening 253 and the operating member 51 may protrude inside the handle 250. Additionally, the pair of push members 34 may protrude rearward of the freezing chamber door 22 through the edge opening 256.

As illustrated in FIG. 5, the operating member 51 is disposed at the center in the horizontal width W1 direction of the handle 250, and may have a horizontal width W2 smaller than the width W1 of the handle 250. Therefore, when the user wants to operate the operating member 51, the user can be guided to open the door by holding the central portion of the handle 250.

In addition, the pair of push members 34 may be disposed on both left and right sides of the operating member 51. As an example, the pair of push members 34 may be located on both left and right ends of the operating member 51 corresponding to the supporter 52. At this time, the width W2 between both ends of the pair of push members 34 may be larger than the width W3 of the operating member 51 and smaller than the width W1 of the handle 250. For example, the width W2 between both ends of the pair of push members 34 may be formed to be half or less than the width W1 of the handle 250. In other words, the push member 34 is located between both ends of the handle 250 and both ends of the operating member 51.

Hereinafter, the operation of the door opening device 30 having the above structure will be examined in more detail with reference to the drawings.

Figure 7:
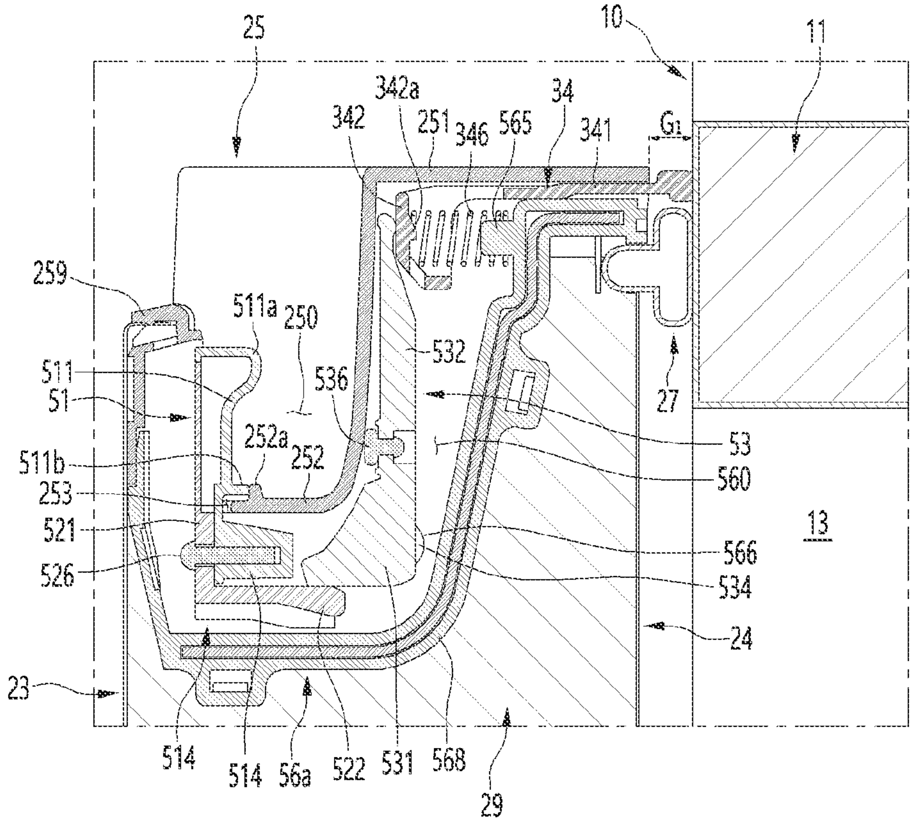
FIG. 7 is a cross-sectional view illustrating the state before operation of the door opening device.
Figure 8:
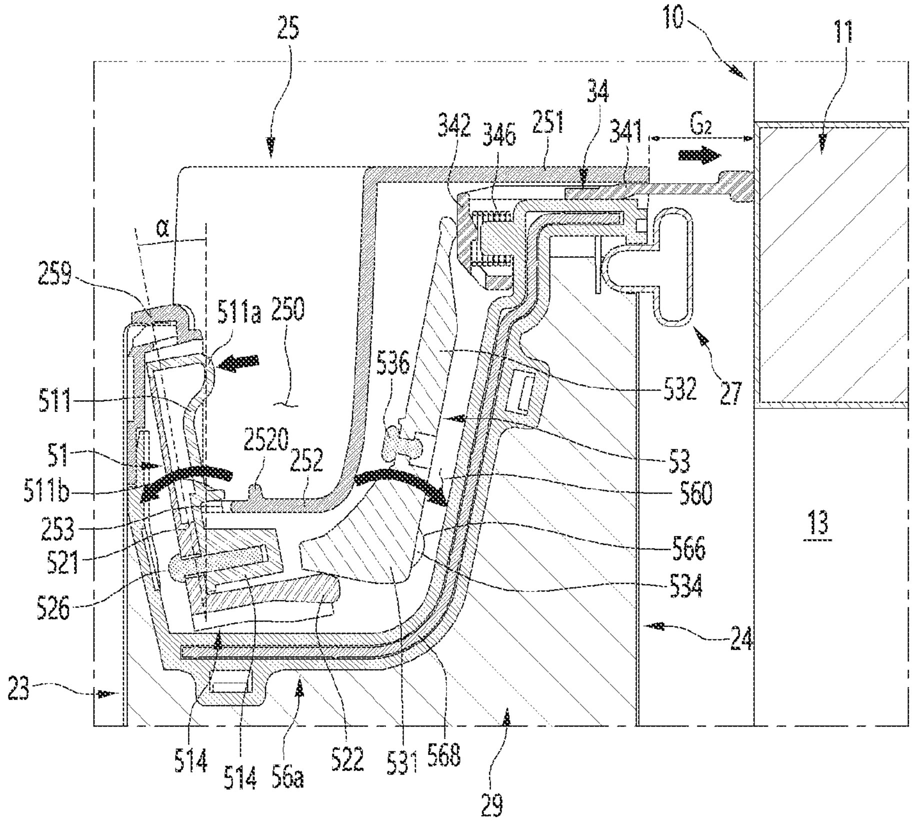
FIG. 8 is a cross-sectional view illustrating the operating state of the door opening device.

FIG. 7 is a cross-sectional view illustrating the state before operation of the door opening device, and FIG. 8 is a cross-sectional view illustrating the operating state of the door opening device.

As illustrated in the drawing, when the freezing chamber door 22 is closed, the door opening device 30 maintains the state illustrated in FIG. 7.

In detail, before operating the door opening device 30, a portion of the operating member 51 is located within the handle 250. At this time, the upper end of the operating member 51 may be most protruding inside the handle 250. In addition, the upper end of the operating member 51 can be maintained at the greatest distance from the front surface of the upper cap decoration 25, that is, the front surface of the freezing chamber door 22.

The supporter 52 maintains contact with the link 53. Supporters 52 on both left and right sides can maintain the same contact state with the links 53 on both sides. At this time, the supporter extension 522 may be in simple contact with the first part 531 and not pressurized to rotate the link 53. As an example, the front end of the supporter extension 522 may be in contact with the lower surface of the first part 531.

In addition, the upper end of the link 53 maintains contact with the push member 34. As an example, the upper end of the rear surface of the second part 532 may be in contact with the front surface of the pressing portion 342.

Meanwhile, the push member 34 can maintain its most forward position due to the elastic force provided by the elastic member 346. In addition, the pressing portion 342 and the second part 532 can be maintained in contact with each other, and the first part 531 and the supporter extension 522 can be maintained in contact with each other.

In addition, the protruding length G1 of the push member 34 from the rear surface of the upper cap decoration 25 to the rear end of the push member 34 may be equal to or slightly smaller than the thickness of the gasket 27. Accordingly, in a state before the operating member 51 is operated, the rear end of the push member 34 may be in contact with or slightly separated from the front surface of the cabinet 10 or the front surface of the barrier 11.

When the freezing chamber door 22 is closed, the user can open the freezing chamber door 22 by putting his hand on the handle 250 and pulling the handle. When the user places his/her hand in the center of the handle 250 and pulls the handle, the operating member 51 can be operated naturally. In other words, the operation of the door opening device 30 and the withdrawal of the freezing chamber door 22 can be performed at the same time simply by holding and pulling the handle 250 without any additional operation.

In addition, when the operating member 51 is operated, the push members 34 located at both ends of the operating member 51 move backward and simultaneously push the cabinet 10 to open the freezing chamber door 22.

In detail, as illustrated in FIG. 8, when the operating member 51 is pressed, the operating member 51 is rotated clockwise by a set angle α with respect to the supporter rotation shaft 525. At this time, the front surface of the operating member 51 moves toward the front surface of the freezing chamber door 22.

When the operating member 51 rotates clockwise, the front end of the supporter extension 522 pushes the first part 531 upward, and the link 53 is rotated counterclockwise about the link rotation shaft 534. At this time, the supports 52 on both sides simultaneously rotate the links 53 on both sides.

As the link 53 rotates, the upper end of the second part 532 pushes the pressing portion 342 of the push member 34, thereby moving the push member 34 rearward. In addition, in the process of moving the push member 34 backward, the elastic member 346 may be compressed. In addition, the rear end of the push member 34 pushes the front surface of the cabinet 10 or the front surface of the barrier 11.

At this time, the protruding length G2 of the push member 34 from the rear surface of the upper cap decoration 25 to the rear end of the push member 34 is larger than the protruding length G1 of FIG. 7. For example, the protruding length G2 is longer than the thickness of the gasket 27 and the length by which the gasket 27 is separated from the cabinet 10 when stretched. Accordingly, the rear end of the push member 34 pushes the front surface of the cabinet 10 or the front surface of the barrier 11 so that the freezing chamber door 22 can be opened more easily.

In particular, a pair of push members 34 can simultaneously push the cabinet 10 from both left and right sides adjacent to the operating member 51, enabling more effective opening, and even if the operation is biased toward one side of the operating member 51, the freezer door 22 can be opened effectively.

Figure 10:
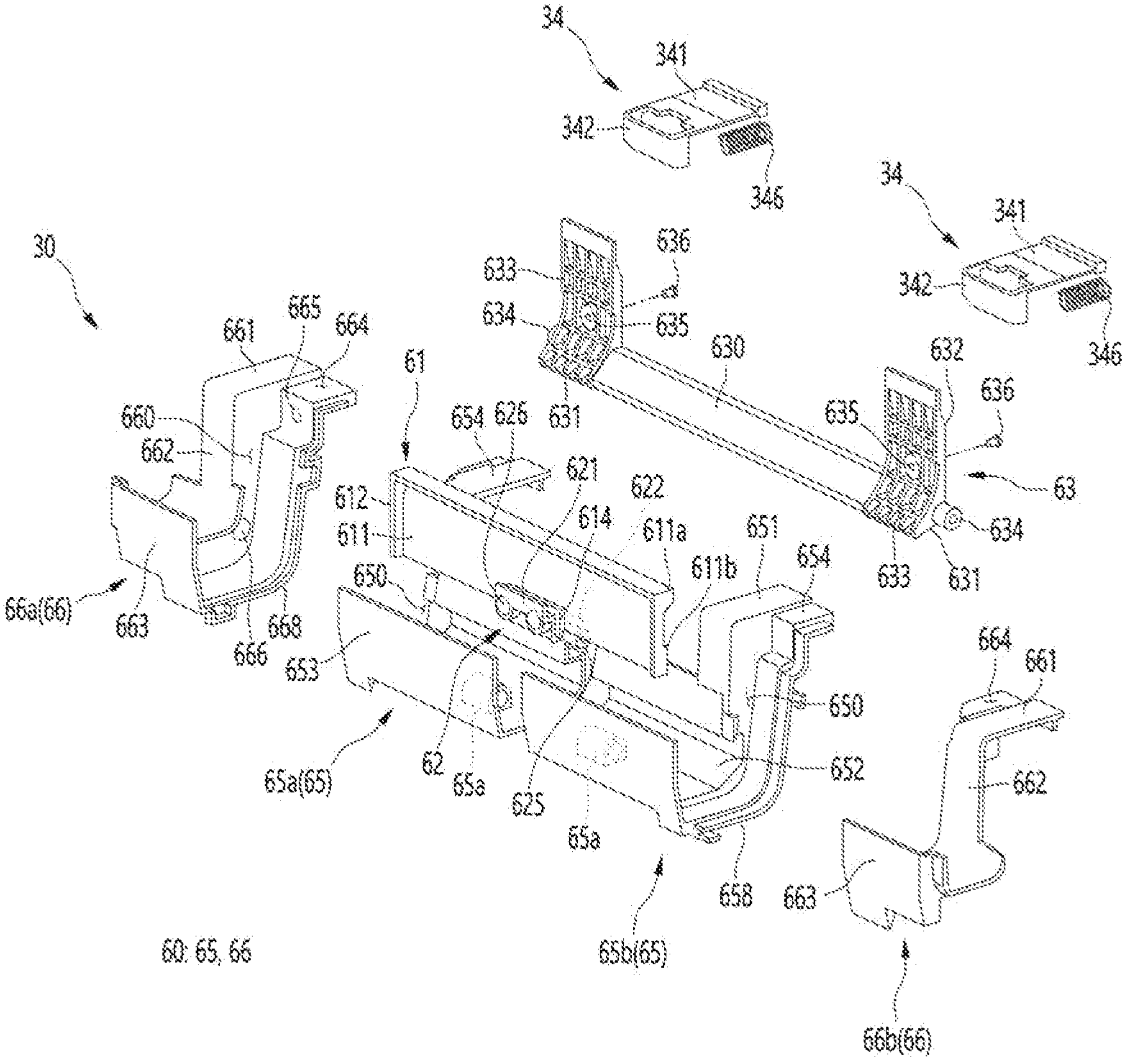
FIG. 10 is an exploded perspective view illustrating a door opening device according to another embodiment of the present disclosure.

In addition, when the user releases his/her hand from the operating member 51 in a state where the opening operation of the freezing chamber door 22 is completed, the push member 34 is moved forward by the elastic restoring force of the elastic member 346, in this process, the link 53 rotates clockwise, and the operating member 51 moves counterclockwise to automatically return to the state before operation of the operating member 51 as illustrated in FIG. 10.

Meanwhile, the present disclosure may be possible in various other embodiments in addition to the above-described embodiments. Another embodiment of the present disclosure is characterized in that the supporter is arranged in a single configuration on the operating member, and a connection portion connecting the pair of links is further formed so that the pair of links is rotated simultaneously by the supporter in the single configuration. In another embodiment of the present disclosure, other components except the supporter and link are the same as the above-described embodiment, and detailed description and illustration of the same components will be omitted and the same symbols will be used to indicate the same components.

Hereinafter, with reference to the drawings, another embodiment of the present disclosure will be discussed.

Figure 9:
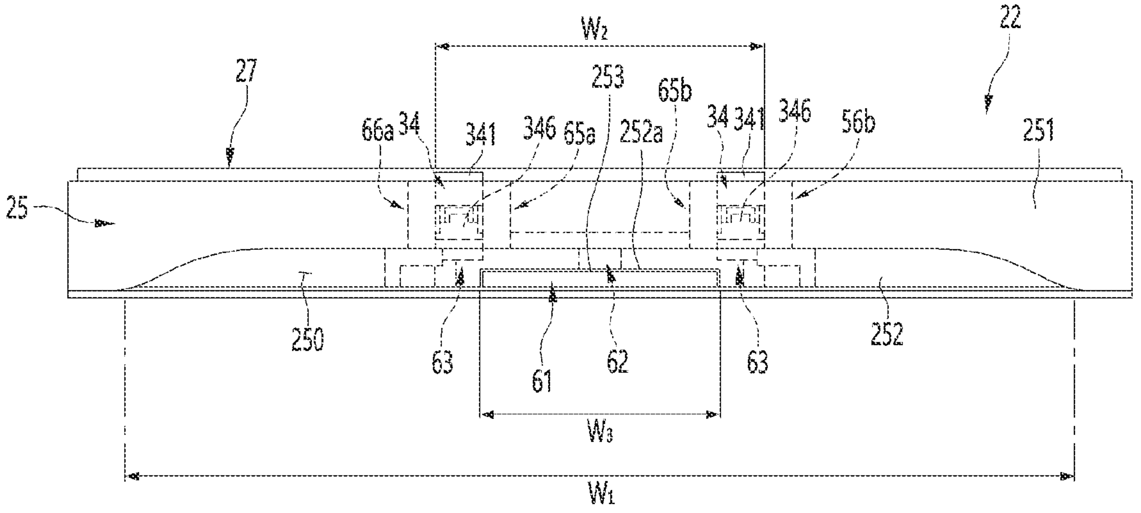
FIG. 9 is a plan view illustrating a door according to another embodiment of the present disclosure.

FIG. 9 is a plan view illustrating a door according to another embodiment of the present disclosure, and FIG. 10 is an exploded perspective view illustrating a door opening device according to another embodiment of the present disclosure.

As illustrated, a door opening device according to another embodiment of the present disclosure may be mounted on the upper cap decoration. Additionally, the door opening device may be mounted to be in contact with the handle on the inside of the door.

The door opening device 30 may include the operating member 61, a link 63, a push member 34, and a case 60.

The operating member 61 includes an operating portion 611 and is exposed through the handle opening 253 so that a user can operate it through the handle 250. Additionally, the operating portion 611 may be provided with the upper protrusion 611*a* and the lower protrusion 611*b*. Additionally, an operating portion edge 612 may be formed around the operating portion 611. The structure of the operating member 61 may be the same as the operating member 51 of the above-described embodiment except for the structure of the operating member coupling portion 614 and the supporter 62.

At the lower end of the operating portion 611, an operating member coupling portion 614 protruding downward may be formed in the center. Additionally, a supporter 62 may be coupled to the operating member coupling portion 614. The supporter 62 may be configured to rotate together with the rotation of the operating member 61 to rotate the link 63. The supporter 62 may be coupled to the operating member 61 in a single configuration. Additionally, the supporter 62 may be molded integrally with the operating member 61.

The supporter 62 may include a supporter body 621 coupled to the operating member 61, and a supporter extension 622 extending from the supporter body 621 to operate the link 63.

The supporter body 621 is disposed on the front surface of the operating member coupling portion 614, and can be firmly coupled to the operating member coupling portion by fastening screws. The supporter extension 622 may extend rearward from the lower end of the supporter body 621. The supporter extension 622 may extend to be in contact with the link 63. Additionally, the link 63 can be rotated by the supporter extension 622.

Supporter rotation shafts 625 may be formed to protrude on both left and right sides of the supporter extension 622.

The supporter rotation shaft 625 may be axially coupled to the inside of the case 60, which will be described below. The supporter rotation shaft 625 may become the rotation shaft of the operation member 61 when the operation member 61 is operated. Also, when the operating member 61 is rotated, the supporter 62 rotates together so that the end portion of the supporter extension 622 rotates the link 63. The supporter rotation shaft 625 may be referred to as a first rotation shaft.

The link 63 may be provided at the rear of the supporter 62. The link 63 allows the push member 34 to be linked when the operating member 61 is operated, and can be rotatably mounted on the case 60. The link 63 may be referred to as a rotating member.

The link 63 may be disposed at the rear facing the operating member 61. Additionally, the link 63 may include a first part 631, a second part 632, and a connection portion 630. The connection portion 630 may be referred to as a third part.

A pair of first parts 631 and second parts 632 having the same structure may be formed on both left and right sides based on the connection portion 630, respectively. In other words, a pair of first parts 631 may be formed on both ends of the link 63, and a second part 632 may be formed on an upper end of the pair of first parts 631.

The connecting portion 630 may extend to connect the first part 631 on both the left and right sides. The connection portion 630 may be molded integrally with the first part 631. Additionally, approximately the central portion of the connection portion 630 may be in contact with the supporter 62. In other words, the supporter extension 622 may extend downward of the connection portion 630 and may contact the central portion of the lower surface of the connection portion 630. Accordingly, when the supporter 62 rotates, the connection portion 630 can be rotated together, and the first part 631 connected to the connection portion 630 can also be rotated together.

The link 63 may include a link rotation shaft 634. The link rotation shaft 634 may protrude laterally from both left and right sides of the link 63. The link rotation shaft 634 may be formed on the side of the first part 631 disposed on both left and right sides. The link rotation shaft 634 may be located at a point between the rear end of the first part 631 and the lower end of the second part 632. The link rotation shaft 634 may be coupled to the inside of the case 60 and may allow the link 63 to rotate within the case 60. The link rotation shaft 634 may be called a second rotation shaft.

The second part 632 may extend upward from the link rotation shaft 634. The second part 632 may extend toward the front end of the push member 34. The second part 632 may be in contact with the front end of the push member 34, and when the link 63 rotates, the second part 632 may push the push member 34 rearward and move the push member.

A plurality of reinforcement portions 633 may be formed on the front surfaces of the first part 631 and the second part 632. Additionally, a mounting hole 535 on which the buffer member 636 is mounted may be formed in the second part 632.

The push member 34 is mounted to be movable back and forth on the case 60 and may be supported by an elastic member 346. The push member 34 may include a sliding portion 341 and a pressing portion 342. The sliding portion 341 may protrude rearward of the freezing chamber door 22. Additionally, the pressing portion 342 may contact the upper end of the link 63, that is, the upper end of the second part 632, and may be moved back and forth as the link 63 rotates. In addition, the elastic member mounting portion **342*a* may be formed in the pressing portion 342**.

The case 60 can form the outer appearance of the door opening device 30, and the operating member 61, link 63, and push member 34 may be mounted inside the case so that the case 60 can be operated. The basic structure of the case 60 and the coupling structure with the upper cap decoration 25 may be the same as the above-described embodiment.

The case 60 may include a center case 65 that forms the central portion of the case 60, and side cases 66 that form both left and right sides of the case 60.

The center case 65 may include an upper surface 651, a recessed surface 652, and a front surface 653. Additionally, the center case 65 may be formed by coupling a first center case **65*a* and a second center case 65*b*** that have the same structure on both left and right sides.

The operating member 61 may be provided in the space formed by the recessed surface 652 of the center case 65. In addition, a first shaft coupling portion 659 on which the supporter rotation shaft 625 is mounted may be formed in the first center case **65*a* and the second center case 65*b*, respectively. The first shaft coupling portion 659 may be formed on both sides of the supporter 62, and may be formed on the recessed surface 652 of the first center case 65*a* and the second center case 65*b***, respectively.

Therefore, when the first center case **65*a* and the second center case 65*b* are coupled to each other, the supporter rotation shaft 625 is inserted into the first shaft coupling portion 659 and the operating member 61 can be rotatably mounted inside the case 60. In addition, the link 63 can be operably disposed in the internal space formed by the recessed surface 652 of the center case 65**.

The center accommodation portion 650 may be formed on both left and right sides of the center case 65. In addition, the center coupling portion 658 may be formed on both left and right ends of the center case 65 where the center accommodation portion 650 is formed. In addition, the center push member accommodation portion 654 may be formed on both left and right sides of the upper surface of the center case 65, respectively.

The side case 66 may be coupled to both left and right ends of the center case 65 to form both sides of the case 60. The side case 66 may include the first side case **66*a* and the second side case 66*b***.

Additionally, the side case 66 may include the upper surface 61, a recessed surface 62, and a front surface 63.

A side accommodation portion 660 that accommodates a portion of the link 63 along with the center accommodation portion 650 may be formed on one side of the side case 66. In addition, a second shaft coupling portion 666 into which the link rotation shaft 634 is inserted may be formed on the inner surface of the side accommodation portion 660.

In other words, the link rotation shaft 634 protruding on both left and right sides of the link 63 can be coupled to the second shaft coupling portion 666 formed in the first side case **66*a* and the second side case 66*b*, respectively. Therefore, in the process of coupling the side case 66 to the center case 65, the link 63 can be rotatably mounted inside the case 60**.

Additionally, a side coupling portion 668 coupled to the center coupling portion 658 may be formed at a side end of the side case 66. In addition, a side push member accommodation portion 664 forming a space in which the push member 34 is accommodated may be formed on the upper surface of the side case 66 along with the center push member accommodation portion 654.

Meanwhile, as illustrated in FIG. 9, the operating member 61 is disposed at the center of the length of the handle 250 in the horizontal width W1 direction, and may have a horizontal width W2 smaller than the width W1 of the handle 250. Therefore, when the user wants to operate the operating member 61, he or she can be guided to open the handle 250 by holding the central portion thereof.

Additionally, the pair of push members 34 may be disposed on both left and right sides of the operating member 61. As an example, the pair of push members 34 may be located on both left and right ends of the operating member 61 corresponding to the supporter 62. At this time, the width W2 between the two ends of the pair of push members 34 may be larger than the width W3 of the operating member 61 and smaller than the width W1 of the handle 250. For example, the width W2 between both ends of the pair of push members 34 may be formed to be half or less than the width W1 of the handle 250. In other words, the push member 34 is located between both ends of the handle 250 and both ends of the operating member 61.

What is claimed is:

1. A refrigerator comprising:

a cabinet having a storage space;

a door configured to open and close the storage space, the door including:

an insulator located within the door; and a cap decoration defining at least a portion of a perimeter of the door, the cap decoration including a recessed handle; and a door opening device at the door, the door opening device being configured to be operated by a user to open the door, the door opening device including:

a case coupled to the cap decoration inside the door, the case defining a space separate from the insulator;

an operating member mounted inside the case and disposed on a recessed inside of the handle and disposed forward from a center of the handle;

a plurality of push members located inside the case, the plurality of push members being spaced from each other at opposite ends of the operating member, the plurality of push members protruding through a rear surface of the door;

at least one link located inside the case, the at least one link operably connecting the operating member and the plurality of push members such that, when the operating member is operated, the plurality of push members simultaneously push the cabinet to open the door, and the operating member is configured to be rotated and move toward a front surface of the door; and at least one supporter coupled at a lower end of the operating member, wherein the at least one supporter includes:

supporter rotation shafts protruding laterally from opposite sides of the at least one supporter and axially coupled to the case, the supporter rotation shafts defining a rotation center of the operating member; and a supporter extension extending from a lower end of the at least one supporter and configured to contact the at least one link to rotate the at least one link when the operating member is operated, and wherein the at least one supporter is made of a material having a higher strength than the operating member.

2. The refrigerator of claim 1, wherein the plurality of push members are a pair of push members, wherein the at least one link includes a pair of links spaced from each other at the opposite ends of the operating member, and wherein the at least one supporter is provided as a pair of supporters, each of the supporters being coupled to a respective opposite end of the operating member and the pair of supporters being configured to contact the pair of links to rotate the links.

3. The refrigerator of claim 2, wherein the operating member and the supporters are configured to rotate together relative to the case.

4. The refrigerator of claim 3, wherein the supporter extension is configured to contact a lower surface of a corresponding link and push the corresponding link upward so the corresponding link rotates when the operating member is operated.

5. The refrigerator of claim 2, wherein each link includes:

a first part extending to contact a corresponding supporter of the pair of supporters;

a second part extending from an end of the first part, the second part being configured to contact a corresponding push member of the pair of push members; and a link rotation shaft located between the first part and the second part, the link rotation shaft being coupled to the case such that the link is rotatable about the link rotation shaft.

6. The refrigerator of claim 2, wherein the case includes:

a center case defining a central portion of the case; and a pair of side cases located at opposite ends of the center case, and wherein each of opposite ends of the center case and the pair of side cases includes:

a first shaft coupling portion coupled to a corresponding supporter rotation shaft of the supporter rotation shafts; and a second shaft coupling portion coupled to a corresponding link rotation shaft of the pair of links.

7. The refrigerator of claim 6, wherein the center case further includes an operating member accommodation portion recessed downward such that the lower end of the operating member is operably accommodated in the operating member accommodation portion.

8. The refrigerator of claim 6, wherein the center case includes a first center case and a second center case coupled to each other.

9. The refrigerator of claim 1, wherein the case includes:

a center case configured to accommodate the operating member therein; and a pair of side cases coupled to opposite ends of the center case, and wherein the at least one link and the plurality of push members are movably mounted in a space defined by the center case and the pair of side cases.

10. The refrigerator of claim 9, wherein the case further includes a plurality of push member accommodation portions recessed between the opposite ends of the center case and the pair of side cases, and wherein each push member is mounted to be slidably movable in a front and rear direction of the refrigerator in a corresponding push member accommodation portion of the plurality of push member accommodation portions.

11. The refrigerator of claim 1, wherein the at least one link includes:

a connection portion extending beyond opposite ends of the at least one supporter, the connection portion being in contact with the at least one supporter;

a pair of first parts located at opposite ends of the connection portion;

a pair of second parts extending upward from the pair of first parts, the pair of second parts being in contact with a corresponding push member of the plurality of push members; and a link rotation shaft protruding from an outer surface of each of the pair of first parts and coupled to the case.

12. The refrigerator of claim 11, wherein the case includes:

a center case defining a central portion of the case to accommodate the operating member and the at least one link therein, the center case having a pair of first shaft coupling portions coupled to the supporter rotation shafts; and a pair of side cases located at opposite ends of the center case, each side case having a second shaft coupling portion coupled to the link rotation shaft of the at least one link.

13. The refrigerator of claim 11, wherein the case includes a first center case and a second center case coupled to each other, each of the first center case and the second center case having a first shaft coupling portion receiving a corresponding supporter rotation shaft of the supporter rotation shafts when the first center case and the second center case are coupled.

14. The refrigerator of claim 12, wherein the link rotation shaft is received in the second shaft coupling portions when the pair of side cases are coupled to the center case.

15. The refrigerator of claim 1, wherein a width of the operating member is smaller than a width of the handle, and wherein the plurality of push members are located between opposite ends of the handle and the opposite ends of the operating member.

16. The refrigerator of claim 1, wherein the handle includes a handle opening, and wherein the plurality of push members are a pair of push members located closer to opposite ends of the handle opening than to the opposite ends of the operating member.

17. The refrigerator of claim 1, wherein the handle includes a handle opening in communication with a recessed space of the handle, and wherein the operating member protrudes into the recessed space of the handle through the handle opening.

18. The refrigerator of claim 17, wherein the handle opening is defined in a front surface and a lower surface of the recessed space of the handle.

19. The refrigerator of claim 1, wherein the cap decoration is an upper cap decoration defining an upper surface of the door, the upper cap decoration including:

a handle opening through which the operating member extends; and a plurality of push member openings through which the plurality of push members extend, and wherein the case is located on a lower surface of the upper cap decoration.

* * * * *